(12) United States Patent
Gibbons et al.

(10) Patent No.: US 12,241,585 B2
(45) Date of Patent: Mar. 4, 2025

(54) J-HOOK BRACKET MOUNT LOCATION MARKERS

(71) Applicant: Klein Tools, Inc., Lincolnshire, IL (US)

(72) Inventors: John Gibbons, Palatine, IL (US); Jace Mattson, Chicago, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

(21) Appl. No.: 18/104,054

(22) Filed: Jan. 31, 2023

(65) Prior Publication Data

US 2024/0255097 A1 Aug. 1, 2024

(51) Int. Cl.
*A47G 1/20* (2006.01)
*F16B 45/00* (2006.01)
*F16M 13/02* (2006.01)

(52) U.S. Cl.
CPC ............ *F16M 13/02* (2013.01); *F16B 45/00* (2013.01)

(58) Field of Classification Search
CPC ........... A47F 5/0006; A47G 1/20; A47G 1/21; F16B 45/00; F16B 45/015; F16B 45/002; F16B 2/00
USPC ............ 248/300, 311, 304, 305, 306, 309.1, 248/316.1, 316.7, 322, 339, 301
See application file for complete search history.

(56) References Cited

U.S. PATENT DOCUMENTS

| | | | | |
|---|---|---|---|---|
| 1,086,893 A * | 2/1914 | Cole | ........................ | F16B 27/00 24/599.9 |
| 1,113,001 A * | 10/1914 | Goar | ..................... | A22C 15/003 248/306 |
| 1,422,128 A * | 7/1922 | Rager | ..................... | A47B 81/00 248/306 |
| 2,204,862 A * | 6/1940 | Lehman | .................. | A47G 1/215 40/785 |
| 4,466,591 A * | 8/1984 | Alonzo | .................. | A47H 1/142 248/217.1 |
| 5,329,675 A * | 7/1994 | McLean | .................. | F16B 45/02 24/599.6 |
| 5,517,735 A * | 5/1996 | Tsai | ........................ | F16B 45/02 24/600.3 |
| 5,538,144 A * | 7/1996 | Reed | ..................... | A47G 25/10 211/32 |
| 5,553,823 A * | 9/1996 | Protz, Jr. | .................. | A01G 5/04 248/339 |
| 5,639,049 A * | 6/1997 | Jennings | ................. | F16L 3/123 248/301 |
| 5,878,988 A * | 3/1999 | Rakower | .................. | A47G 1/20 248/497 |
| 6,338,463 B1 * | 1/2002 | Babitz | .................... | A45C 13/18 248/306 |
| 6,473,983 B1 * | 11/2002 | Gier | ....................... | A47G 1/205 33/613 |
| 6,637,707 B1 * | 10/2003 | Gates | .................. | A47B 96/061 248/222.12 |

(Continued)

*Primary Examiner* — Nkeisha Smith

(57) ABSTRACT

A device for supporting an object on a structure includes a mounting member having a front face and a side face, a first mounting hole and a second mounting hole passing through the front face, wherein the first mounting hole is a first distance from the second mounting hole, a first positioning structure and a second positioning structure on the side face, wherein the first positioning structure is a second distance from the second positioning structure, wherein the first distance is the same as the second distance, and a hook on the front face.

17 Claims, 4 Drawing Sheets

(56) References Cited

U.S. PATENT DOCUMENTS

| | | | | |
|---|---|---|---|---|
| 7,836,604 | B2* | 11/2010 | Paharik | A47G 1/205 |
| | | | | 33/666 |
| 8,113,476 | B2* | 2/2012 | Serio | A47G 1/20 |
| | | | | 248/306 |
| 9,872,574 | B2* | 1/2018 | Royak | F16M 13/02 |
| 11,047,526 | B2* | 6/2021 | Karaaslan | A47B 96/06 |
| 11,255,651 | B2* | 2/2022 | Medina | G01C 9/34 |
| 11,399,641 | B1* | 8/2022 | Garriott | A47G 1/1606 |
| 11,690,468 | B1* | 7/2023 | Xu | A47H 1/142 |
| | | | | 248/251 |
| 11,788,678 | B2* | 10/2023 | Xu | A47H 1/142 |
| | | | | 248/304 |
| 2004/0036303 | A1* | 2/2004 | Yu | F16B 45/036 |
| | | | | 294/82.19 |
| 2004/0216319 | A1* | 11/2004 | Muchnik | B25H 7/045 |
| | | | | 33/666 |
| 2008/0073476 | A1* | 3/2008 | Wong | A47G 1/1626 |
| | | | | 248/467 |
| 2009/0165319 | A1* | 7/2009 | Gallien | A47G 1/205 |
| | | | | 33/666 |
| 2014/0367527 | A1* | 12/2014 | Anderson | F16L 3/133 |
| | | | | 248/316.1 |
| 2016/0108953 | A1* | 4/2016 | Osaki | F16B 45/026 |
| | | | | 248/305 |
| 2017/0150834 | A1* | 6/2017 | Sergyeyenko | A47G 1/24 |
| 2019/0239661 | A1* | 8/2019 | McGowan | A47G 1/1666 |
| 2019/0257469 | A1* | 8/2019 | Ullah | A47G 1/175 |
| 2023/0212866 | A1* | 7/2023 | Krakow | G01B 5/25 |
| | | | | 33/533 |
| 2023/0235775 | A1* | 7/2023 | Cowell | F16B 45/028 |
| | | | | 294/82.19 |

* cited by examiner

J-HOOK BRACKET MOUNT LOCATION MARKERS

BACKGROUND

The present disclosure relates to brackets, and more specifically j-hook hanger brackets. As is known in the art, brackets (e.g., hangers) commonly use through holes where a screw may be used to affix or hang the bracket to a surface (e.g., a wall). Some examples of through holes that are known in the art include keyholes. Keyholes allow a bracket to be removably screwed or nailed to a wall. As is known in the arts, brackets often have multiple keyholes which may be used to hang the bracket onto multiple attachment points (e.g., screw and/or nails). Where multiple attachment points are used, it may be desirable to quickly and easily mark and affix nails or screws to a surface to mount a bracket such as a j-hook.

SUMMARY OF THE DISCLOSURE

In accordance with one feature of this disclosure, a device for supporting an object on a structure (e.g., a j-hook bracket) is provided and includes a mounting member having a front face and a side face and a first mounting hole and a second mounting hole passing through the front face. The first mounting hole is a first distance from the second mounting hole. The device includes a first positioning structure and a second positioning structure on the side face. The first positioning structure is a second distance from the second positioning structure, and the first distance is the same as the second distance. The device includes hook on the front face.

In one feature, the device includes a retainment clip having a first end rotatably attached to the front face and a second end removably attachable to the hook.

According to another feature, the first distance comprises a distance between a midpoint of the first mounting hole and a midpoint of the second mounting hole, and the second distance comprises a distance between a midpoint of the first positioning structure and the second positioning structure.

As one feature, the device includes a third mounting hole passing through the front face between the first mounting hole and the second mounting hole, and a third positioning structure on the side face between the first positioning structure and the second positioning structure. The distance between the first mounting hole and the third mounting hole is the same as a distance between the first positioning structure and the third positioning structure.

According to one feature, the first positioning structure comprises a protruding nub.

In one feature, the first positioning structure and the second positioning structure are configured to, when pressed to a surface by a user, leave a pair of indents on the surface.

According to another feature, at least one of the first mounting hole or the second mounting hole is a keyhole.

In accordance with one feature of this disclosure, a device for supporting an object on a structure (e.g., a j-hook) is provided and includes a mounting member having a front face and a side face, a first mounting hole and a second mounting hole passing through the front face, wherein the first mounting hole is a first distance from the second mounting hole, and a first positioning structure and a second positioning structure on the side face. The first positioning structure is a second distance from the second positioning structure, the first distance is the same as the second distance, and the first positioning structure and the second positioning structure protrude from the side face such that, when pressed to a surface, the first positioning structure and the second positioning structure leave a pair of indication marks indented onto the surface. The device includes a hook on the front face.

In accordance with one feature of this disclosure, a device for supporting an object on a structure (e.g., a j-hook) is provided and includes a mounting member having a front face and a side face, a first mounting hole and a second mounting hole passing through the front face, wherein the first mounting hole is a first distance from the second mounting hole, and a first positioning structure and a second positioning structure on the side face. The first positioning structure is a second distance from the second positioning structure, the first distance is the same as the second distance; and the first positioning structure and the second positioning structure protrude from the side face such that, when pressed to a surface, the first positioning structure and the second positioning structure leave a pair of indication marks indented onto the surface.

According to another feature, the front face comprises a hook, and the device further includes a retainment clip having a first end rotatably attached to the front face and a second end removably attachable to the hook.

It should be understood that the inventive concepts disclosed herein do not require each of the features discussed above, may include any combination of the features discussed, and may include features not specifically discussed above.

DETAILED DESCRIPTION OF PREFERRED EMBODIMENTS

Figure 1:
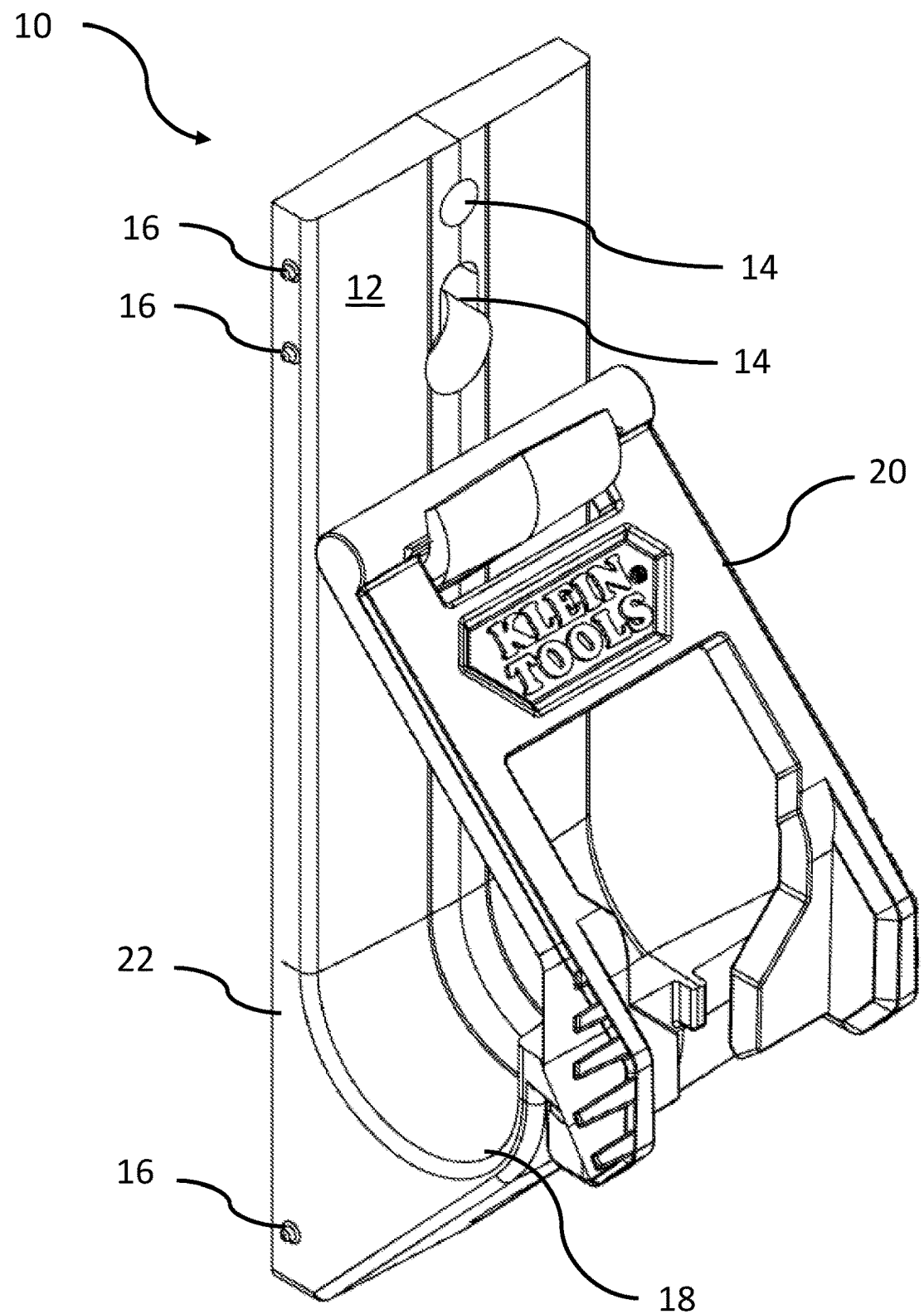
FIG. 1 is a perspective view from the front and side of a j-hook.

As shown in FIG. 1, a mounting hook (e.g., bracket) in the form of a j-hook 10 is provided. In the illustrated and preferred embodiment, the j-hook 10 includes a mounting member 12 (e.g., mounting face, elongated mounting member, etc.) having a front face 13 (e.g., front) and plurality of mounting holes 14 passing therethrough. In the illustrated and preferred embodiment, the mounting holes 14 allow for the j-hook 10 to be mounted to a surface such as a wall. In the illustrated and preferred embodiment, the mounting member 12 includes a side face 22 (e.g., side) having a plurality of positioning structures 16 to aid a user in the process of installing the j-hook 10. In the illustrated and preferred embodiment, the j-hook 10 includes a hook member 18 (e.g., hook) and a hook retaining structure 20 (e.g., retainment clip).

Figure 2:
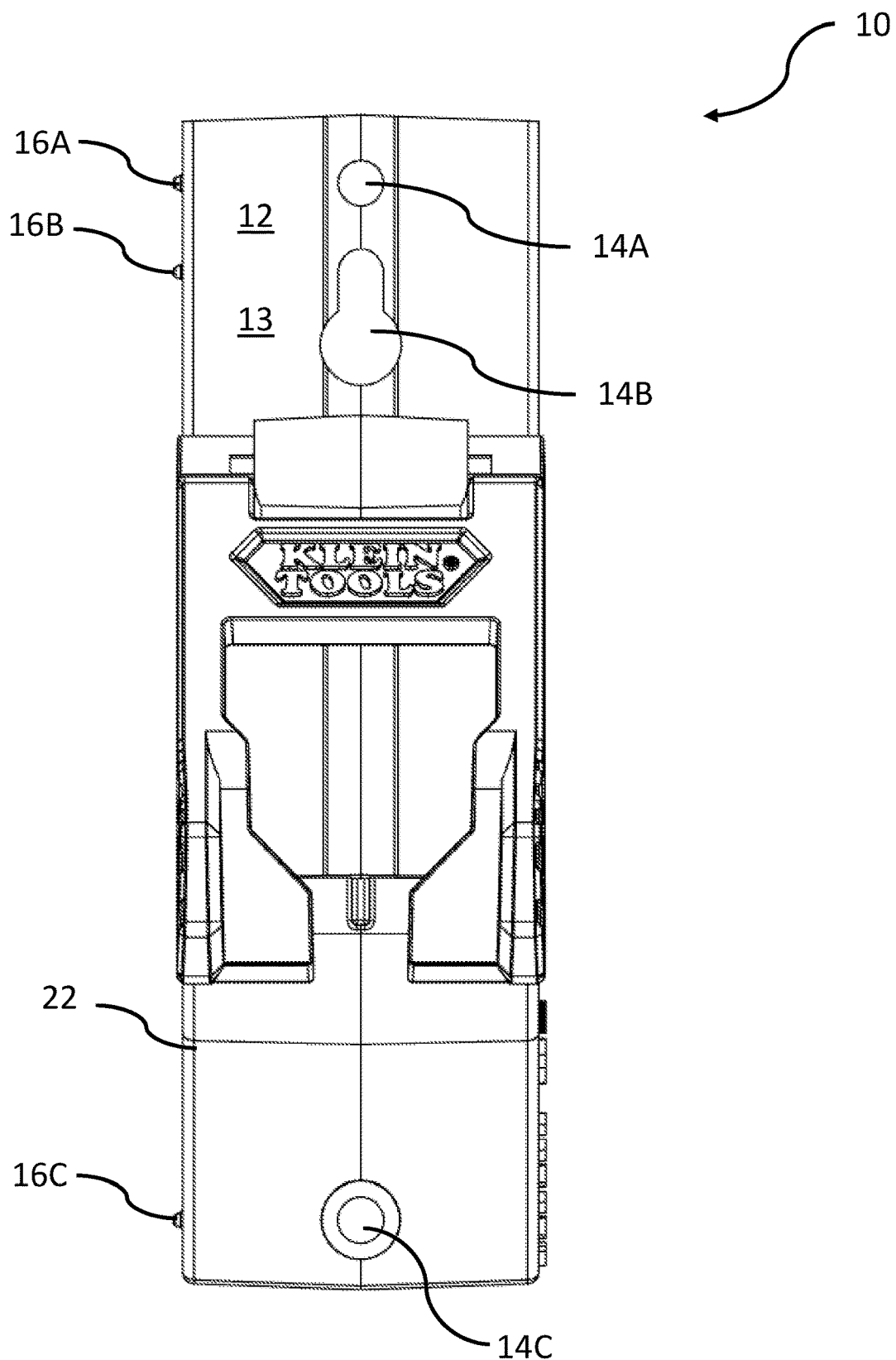
FIG. 2 is a front view of the j-hook of FIG. 1.
Figure 3:
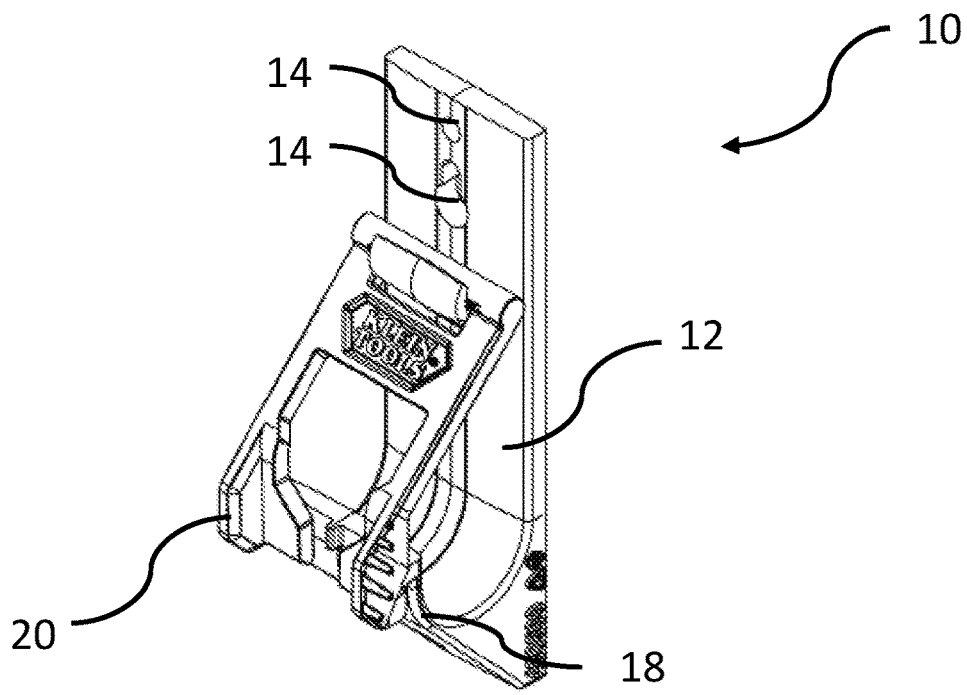
FIG. 3 is another perspective view of the j-hook of FIG. 1.

As best shown in FIG. 2, the j-hook 10 in the illustrated and preferred embodiment includes three mounting holes 14 (e.g., through holes) passing through the front face 13 of the mounting member 12. The top (e.g., first) mounting hole 14A and the bottom (e.g., third) mounting hole 14C are shown in the form of circular holes passing through the mounting member 12, and the middle (e.g., second) mounting hole 14B is shown in the form of a keyhole. Circular holes (e.g., top mounting hole 14A and bottom mounting hole 14C) may be used, for example, for permanent mounting of the j-hook by using screws or nails to affix the j-hook to a surface such as a wall. As is known in the arts, keyholes such as the middle mounting hole 14B allow for the j-hook 10 to be removably mounted onto a wall by, for example, using screws or nails.

In the illustrated and preferred embodiment, the j-hook includes three positioning structures 16 (e.g., mounting indicators, mounting markers) protruding from the side face 22 of the mounting member 12. Each of the positioning structures 16 is shown in the form of a nub protruding from the side face 22 of the mounting member 12. The positioning structures 16, when the side face 22 of the mounting member 12 is pressed against a surface, such as a wall, protrude such that they leave an imprint (e.g., mark, indent) on the surface (e.g., wall).

As is best shown in the illustrated and preferred embodiment of FIG. 2, each of the positioning structures 16 are aligned with an associated mounting hole 14 along the length of the mounting member 12. For example, the top mounting hole 14A is aligned with a top positioning structure 16A, the middle mounting hole 14B is aligned with a middle positioning structure 16B, and the bottom mounting hole 14C is aligned with the bottom positioning structure 16B.

In the illustrated and preferred embodiment, each of the positioning structures 16 are aligned with an associated mounting hole 14 such that the positioning structures, when the side face 22 of the mounting member 12 is pressed against a surface, leave marks on the surface that align with the mounting holes 14. The marks, for example, indicate to a user where to mount hanging structures such as screws and/or nails that align with the mounting holes 14. In the illustrated and preferred embodiment, each positioning structure 16 is aligned with a midpoint of the associated mounting hole 14 such that the mark (e.g., indication) left by the positioning structures 16 are aligned with the midpoint (e.g., middle) of the mounting holes 14.

As best shown in FIG. 2 and in the illustrated and preferred embodiment, a distance between the top mounting hole 14A and the bottom mounting hole 14C is the same as (e.g., substantially similar to) a distance between the top positioning structure 16A and the bottom positioning structure 16C. In the illustrated and preferred embodiment, a distance between the top mounting hole 14A and the middle mounting hole 14B is the same as a distance between the top positioning structure 16A and the middle positioning structure 16B. In the illustrated and preferred embodiment, a distance between the middle mounting hole 14B and the bottom mounting hole 14C is the same as a distance between the middle positioning structure 16B and the bottom positioning structure 16C.

In the illustrated and preferred embodiment, a distance between at least one of the positioning structures 16 and the top of the j-hook 10 is the same as the distance between at least one of the mounting holes 14 and the top of the j-hook 10. For example, in the illustrated and preferred embodiment, a distance between the top positioning structures 16A and the top of the j-hook 10 is the same as the distance between the top mounting hole 14A and the top of the j-hook 10. As another example, in the illustrated and preferred embodiment, a distance between the middle positioning structure 16B and the top of the j-hook 10 is the same as the distance between the middle mounting hole 14B and the top of the j-hook 10. As a further example, in the illustrated and preferred embodiment, a distance between the bottom positioning structure 16C and the top of the j-hook 10 is the same as the distance between the bottom mounting hole 14C and the top of the j-hook 10.

In the illustrated and preferred embodiment, a distance between at least one of the positioning structures 16 and the bottom of the j-hook 10 is the same as the distance between at least one of the mounting holes 14 and the bottom of the j-hook 10. For example, in the illustrated and preferred embodiment, a distance between the top positioning structure 16A and the bottom of the j-hook 10 is the same as the distance between the top mounting hole 14A and the bottom of the j-hook 10. As another example, in the illustrated and preferred embodiment, a distance between the middle positioning structure 16B and the bottom of the j-hook 10 is the same as the distance between the middle mounting hole 14B and the bottom of the j-hook 10. As a further example, in the illustrated and preferred embodiment, a distance between the bottom positioning structure 16C and the bottom of the j-hook 10 is the same as the distance between the bottom mounting hole 14C and the bottom of the j-hook 10.

In the illustrated and preferred embodiment, the positioning structures 16 are configured such that they leave an indication on a surface such as a wall when pressed against the surface, e.g., by a user. The user, for example, uses the indications left by the positioning structures 16 to mark the location to mount screws and/or nails to hang the j-hook 10 via the mounting holes 14. As another example, the user may use the indications to pre-drill holes that align with the mounting holes 14 to hang the j-hook.

Figure 4:
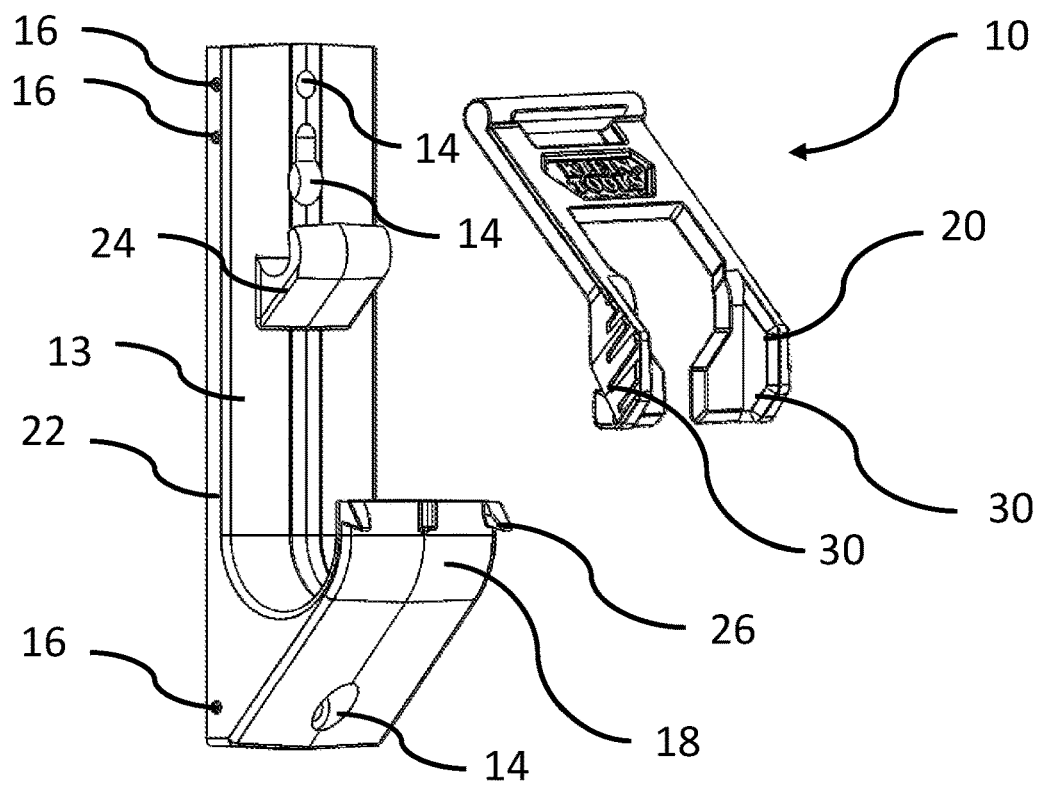
FIG. 4 is a disassembled perspective view of the j-hook of FIG. 1.
Figure 5:
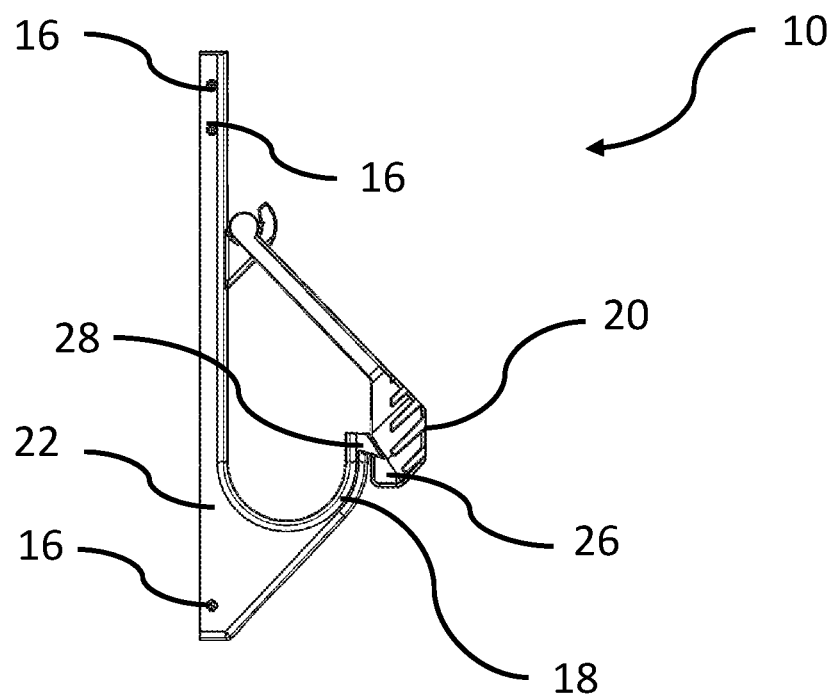
FIG. 5 is a side view of the j-hook of FIG. 1.
Figure 6:
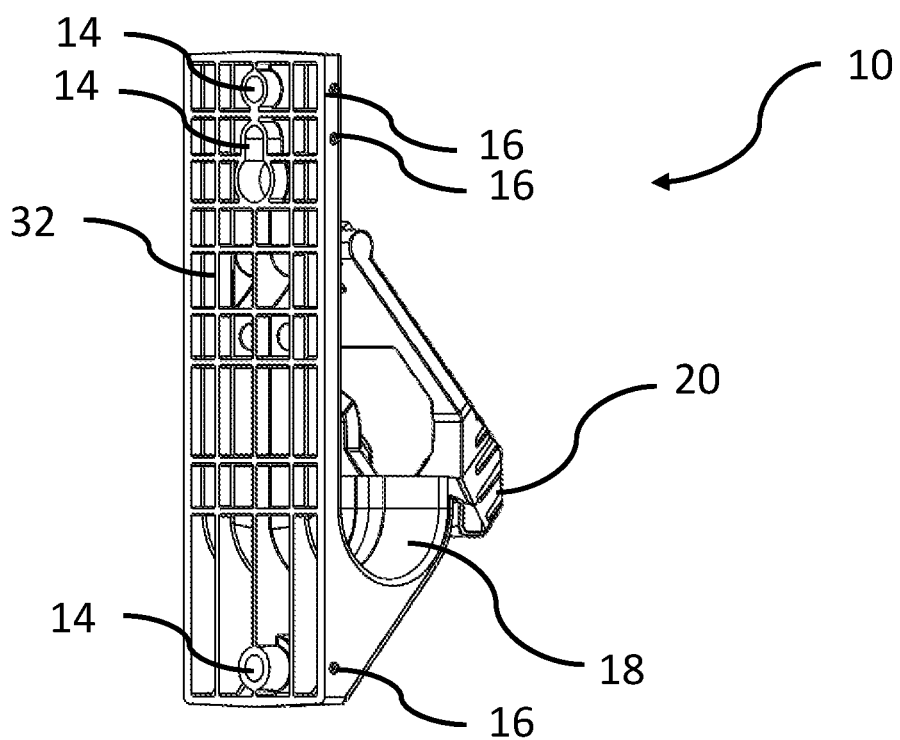
FIG. 6 is a rear perspective view of the j-hook of FIG. 1.

In the illustrated and preferred embodiment, the hook member 18 (e.g., hook) protrudes from the mounting member. In some examples, the hook member 18 is a unitary part of the j-hook 10. In some examples, the hook member may be permanently or removably attached to the j-hook 10. As is known in the art, the hook member 18 may be used to hang items, such as, for example, cables or tools from the j-hook. As best shown in FIG. 4, the j-hook 10 of the illustrated and preferred example includes a removable hook retaining structure 20. In the illustrated and preferred embodiment, the j-hook includes a clip 24 configured to receive the retaining structure 20. The retaining structure 20 is configured to attach to the clip 24 and is rotatable relative to the clip 24. In the illustrated and preferred embodiment, the retaining structure 20 comprises a protruding lip 26 (as best seen in FIG. 5) that that is configured to releasably engage a protruding nub 28 of the hook 18. In the illustrated and preferred example, the protruding lip 26 of the retaining structure 20 may be released from the protruding nub 28 by squeezing the retaining structure sides 30 together.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the j-hook 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

For example, while specific and preferred forms have been shown for the j-hook 10 to include positioning structures 16 protruding from the side face 22, the j-hook may include positioning structures taking different forms such as markers using ink. In such an example, the position structures 16, may leave a mark on a surface using ink. As another example, while the j-hook 10 has been shown to include three positioning structures 16, some examples may include more than three positioning structures 16 or fewer than three positioning structures 16 (e.g., two positioning structures 16).

As a further example, while the j-hook 10 has been shown as comprising two mounting holes 14 in the form of circular/round holes (e.g., top mounting hole 14A and bottom mounting hole 14C) and one mounting hole 14 in the form of a keyhole (e.g., middle mounting hole 14B), any type (e.g., shape) or combination of types of mounting holes that are known in the art may be used. In some examples, the j-hook 10 may use two or three keyhole shaped mounting holes 14 and no circular or round mounting holes 14. In some examples, the j-hook 10 may use two or three circular or round mounting holes 14 and no keyhole shaped mounting holes 14.

As a further example, while the j-hook 10 is shown comprising a hook member 18, in some examples the j-hook 10 may not include the hook member 18. In such examples, the j-hook may include any other mounting or attachment structures, as is known in the art, to attach to or support items on the j-hook 10.

As another example, while the j-hook 10 is shown including the hook retaining structure 20, in some examples the j-hook 10 may not include the hook retaining structure 20.

As a further example, while the positioning structures 16 are shown on one side face 22 of the j-hook 10, the positioning structures 16 may be included on more than one side of the j-hook (e.g., both sides of the j-hook 10). In some examples, the positioning structures 16 may be located on the back 32 of the mounting member 12 (e.g., rear side of the front face 13). For example, the positioning structures 16 may be located next to the mounting holes 14.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A device for supporting an object on a structure, the device comprising:
    a mounting member having a front face and a side face:
    a first mounting hole and a second mounting hole passing through the front face, wherein the first mounting hole is a first distance from the second mounting hole;
    a first positioning structure and a second positioning structure on the side face, wherein the first positioning structure is a second distance from the second positioning structure;
    wherein the first distance is a same distance as the second distance; and
    a hook on the front face.

2. The device of claim 1, further comprising a retainment clip having a first end rotatably attached to the front face and a second end removably attachable to the hook.

3. The device of claim 1, wherein:
    the first distance comprises a distance between a midpoint of the first mounting hole and a midpoint of the second mounting hole; and
    the second distance comprises a distance between a midpoint of the first positioning structure and the second positioning structure.

4. The device of claim 1, the device further comprising:
    a third mounting hole passing through the front face between the first mounting hole and the second mounting hole; and
    a third positioning structure on the side face between the first positioning structure and the second positioning structure;
    wherein a distance between the first mounting hole and the third mounting hole is the same as a distance between the first positioning structure and the third positioning structure.

5. The device of claim 1, wherein the first positioning structure comprises a protruding nub.

6. The device of claim 1, wherein the first positioning structure and the second positioning structure are configured to, when pressed to a surface by a user, leave a pair of indents on the surface.

7. The device of claim 1, wherein at least one of the first mounting hole or the second mounting hole is a keyhole.

8. A device for supporting an object on a structure, the device comprising:
    a mounting member having a front face and a side face:
    a first mounting hole and a second mounting hole passing through the front face, wherein the first mounting hole is a first distance from the second mounting hole;
    a first positioning structure and a second positioning structure on the side face, wherein the first positioning structure is a second distance from the second positioning structure;
    wherein the first distance is a same distance as the second distance; and
    wherein the first positioning structure and the second positioning structure protrude from the side face such that, when pressed to a surface, the first positioning structure and the second positioning structure leave a pair of indication marks indented onto the surface; and
    a hook on the front face.

9. The device of claim 8, further comprising a retainment clip having a first end rotatably attached to the front face and a second end removably attachable to the hook.

10. The device of claim 8, wherein:
the first distance comprises a distance between a midpoint of the first mounting hole and a midpoint of the second mounting hole; and
the second distance comprises a distance between a midpoint of the first positioning structure and the second positioning structure.

11. The device of claim 8, the device further comprising:
a third mounting hole passing through the front face between the first mounting hole and the second mounting hole; and
a third positioning structure on the side face between the first positioning structure and the second positioning structure;
wherein a distance between the first mounting hole and the third mounting hole is the same as a distance between the first positioning structure and the third positioning structure.

12. The device of claim 8, wherein at least one of the first mounting hole or the second mounting hole is a keyhole.

13. A device for supporting an object on a structure, the device comprising:
a mounting member having a front face and a side face;
a first mounting hole and a second mounting hole passing through the front face, wherein the first mounting hole is a first distance from the second mounting hole;
a first positioning structure and a second positioning structure on the side face, wherein the first positioning structure is a second distance from the second positioning structure;
wherein the first distance is a same distance as the second distance; and
wherein the first positioning structure and the second positioning structure protrude from the side face such that, when pressed to a surface, the first positioning structure and the second positioning structure leave a pair of indication marks indented onto the surface.

14. The device of claim 13, wherein:
the first distance comprises a distance between a midpoint of the first mounting hole and a midpoint of the second mounting hole; and
the second distance comprises a distance between a midpoint of the first positioning structure and the second positioning structure.

15. The device of claim 13, the device further comprising:
a third mounting hole passing through the front face between the first mounting hole and the second mounting hole; and
a third positioning structure on the side face between the first positioning structure and the second positioning structure;
wherein a distance between the first mounting hole and the third mounting hole is the same as a distance between the first positioning structure and the third positioning structure.

16. The device of claim 13, wherein at least one of the first mounting hole or the second mounting hole is a keyhole.

17. The device of claim 13, wherein the front face comprises a hook, the device further comprising a retainment clip having a first end rotatably attached to the front face and a second end removably attachable to the hook.

* * * * *